United States Patent [19]
Sweitzer, Jr.

[11] Patent Number: 5,704,545
[45] Date of Patent: Jan. 6, 1998

[54] CLIMATE CONTROL SYSTEM

[76] Inventor: Bruce Kenneth Sweitzer, Jr., 2145 N. Glade Rd., Swanton, Md. 21561

[21] Appl. No.: 726,784

[22] Filed: Oct. 7, 1996

Related U.S. Application Data

[62] Division of Ser. No. 522,494, Aug. 31, 1995, Pat. No. 5,588,591.

[51] Int. Cl.$^6$ ........................................ F24D 3/00
[52] U.S. Cl. ........................................ 237/8 R; 454/258
[58] Field of Search ........................ 237/8 R; 454/258, 454/335

[56] References Cited

U.S. PATENT DOCUMENTS

| | | |
|---|---|---|
| 2,152,699 | 4/1939 | Kuester et al. |
| 2,575,907 | 11/1951 | Carlson. |
| 2,749,050 | 6/1956 | Booth. |
| 2,751,152 | 6/1956 | Ellenberger. |
| 3,398,891 | 8/1968 | Horne. |
| 3,863,612 | 2/1975 | Wiener. |
| 4,192,455 | 3/1980 | Rasmussen et al. |
| 4,206,874 | 6/1980 | Semple. |
| 4,433,810 | 2/1984 | Gottlieb. |
| 5,137,079 | 8/1992 | Anderson. |
| 5,178,324 | 1/1993 | Moesby. |
| 5,344,069 | 9/1994 | Narikiyo ........................ 236/49.3 |
| 5,348,078 | 9/1994 | Dushane et al. .................. 165/22 |
| 5,367,601 | 11/1994 | Hannabery. |
| 5,373,987 | 12/1994 | Corabatir. |

FOREIGN PATENT DOCUMENTS 31 33 681   3/1983   Germany.

*Primary Examiner*—Henry Bennett
*Assistant Examiner*—Derek S. Boles
*Attorney, Agent, or Firm*—Richard C. Litman

[57] ABSTRACT

A heating system that allows independent control of the temperatures within different rooms in a building by independently controlling the flow of heating fluid to each room in response to a thermostat provided in each individual room. The output of the thermostat controls the operation of a three-way valve upstream of a radiator or convector in each room. When the room temperature is at or above the setpoint for that room, the valve operates to divert all heating fluid flow through a bypass pipe or shunt extending from the valve to the outlet of the radiator or convector. When the temperature drops below the setpoint, the valve operates to resume heating fluid flow through the radiator or convector while shutting off heating fluid flow through the bypass pipe. In another embodiment, independent control of room temperature in heated air distribution systems, is effected by thermostatically controlled louvers provided at the heated air register in each room. When the room temperature is at or above the setpoint for the particular room, the louvers shut off heated air flow to the room thereby preventing further heating of the room.

4 Claims, 6 Drawing Sheets

CLIMATE CONTROL SYSTEM

CROSS-REFERENCE TO RELATED APPLICATIONS

This application is a division of application Ser. No. 08/522,494, filed Aug. 31, 1995, U.S. Pat. No. 5,888,591.

BACKGROUND OF THE INVENTION

1. Field of the Invention

The present invention relates to a system for independently controlling the climate in individual rooms within a building.

2. Description of the Prior Art

Most heating systems currently in use for heating buildings, control building temperature by controlling the temperature of the heating fluid at a central location. Thus, the temperature of heating fluid supplied to each room is about the same throughout the building. However, different rooms within a building often have different heating requirements. For example, some rooms may receive more sunlight than other rooms, or rooms that are located upstream in a wind, relative to other rooms in the building, tend to lose heat faster than the other rooms. Therefore, when all the rooms in a building are supplied with a heating fluid at the same temperature, some rooms tend to be come uncomfortably hot while other rooms become uncomfortably cold.

For the aforementioned reasons, various systems have been proposed in the prior art for independently controlling the temperature in different rooms within a building.

U.S. Pat. No. 2,575,907, issued to Carlson, shows a heating system where thermostats are provided in individual rooms for controlling the mixing ratio of air passing through a radiator and air that bypasses the radiator. Carlson does not show an electromagnetically controlled valve for diverting liquid from a heat dissipation unit or louvers that completely shut off air flow through a warm air register.

U.S. Pat. No. 4,192,455, issued to Rasmussen et al., shows a heating system where flow through individual radiators is controlled by a valve responsive to a sensor located in each room. Rasmussen et al. do not show the bypass pipe of the present invention or louvers that completely shut off air flow through a warm air register.

U.S. Pat. No. 4,206,874, issued to Semple, shows a heating system where flow through each radiator is controlled by an associated control valve. Semple does not show individual thermostatic control of the valves for each radiator, or louvers that completely shut off air flow through a warm air register.

U.S. Pat. No. 4,433,810, issued to Gottlieb, shows a heating system where heat dissipation through individual radiators is controlled by controlling the speed of a centrifugal pump used to circulate liquid through the heating system. Gottlieb does not show an electromagnetically controlled valve for diverting liquid from a heat dissipation unit or louvers that completely shut off air flow through a warm air register.

U.S. Pat. No. 5,178,324, issued to Moesby, shows a heating system where flow through individual radiators is controlled by a thermostatic valve. Moesby does not show the bypass pipe of the present invention or louvers that completely shut off air flow through a warm air register.

U.S. Pat. No. 5,344,069, issued to Narikiyo, shows a hot air heating system where heating of individual rooms is independently controlled by secondary heaters provided for each room. Dampers 13 in Narikiyo are not designed to completely shut off the flow of heated air to each room, unlike the louvers of the present invention.

U.S. Pat. No. 5,367,601, issued to Hannabery, shows a heat pump having a supplemental heating unit. Hannabery does not address the independent control of temperature in individual rooms in a building.

U.S. Pat. No. 5,373,987, issued to Corabatir, shows an apparatus for controlling the flow rate of heating air in response to a thermostat located in the room being heated. Corabatir controls air flow by changing the gap between annular sleeves and a circular end plate. Corabatir does not teach or suggest the elongated rectangular louvers and the associated actuating mechanism used in the present invention.

German Patent Document Number 3133681 A1, by Braun, shows a heating system where flow through a radiator is controlled by a thermostatic valve. Moesby does not show the bypass pipe of the present invention or louvers that completely shut off air flow through a warm air register.

None of the above inventions and patents, taken either singly or in combination, is seen to describe the instant invention as claimed.

SUMMARY OF THE INVENTION

The present invention is directed to a climate control system that allows independent control of the temperatures within different rooms in a building by independently controlling the flow of heating cooling fluid to each room in response to a thermostat provided in each individual room. In the present invention, the output of the thermostat controls the operation of a three-way valve upstream of a radiator or convector in each room. When the room temperature is at or above the setpoint for that room during a heating cycle, the valve operates to divert all heating fluid flow through a bypass pipe or shunt extending from the valve to the outlet of the radiator or convector. In this way, heat is no longer supplied to the room while the flow through the bypass minimizes any disturbance in the fluid flow conditions in the rest of the heating fluid supply circuit. When the temperature drops below the setpoint during a heating cycle, the valve operates to resume heating fluid flow through the radiator or convector while shutting off heating fluid flow through the bypass pipe.

In another embodiment, independent control of room temperature in air distribution systems, is effected by thermostatically controlled louvers provided at the air register in each room. In this embodiment, when the room temperature is at or above the setpoint for the particular room during a heating cycle, and below the setpoint temperature during a cooling cycle, the louvers shut off air flow to the room thereby preventing further heating or cooling of the room. When the temperature drops below the setpoint during a heating cycle, and raises above the setpoint temperature during a cooling cycle, the louvers are opened allowing the heating or cooling of the room to resume.

Accordingly, it is a principal object of the invention to provide for the independent control of the temperature in individual rooms within a building.

It is another object of the invention to minimize the effect of shutting off heating/cooling fluid flow to any one room, on the rest of the climate control system.

It is a further object of the invention to provide thermostatically controlled louvers that shut off heated or cooled air flow to a room when the room temperature reaches the thermostat setpoint.

Still another object of the invention is to provide a system for the independent control of the temperature in individual rooms within a building, which is retrofittable to existing systems.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
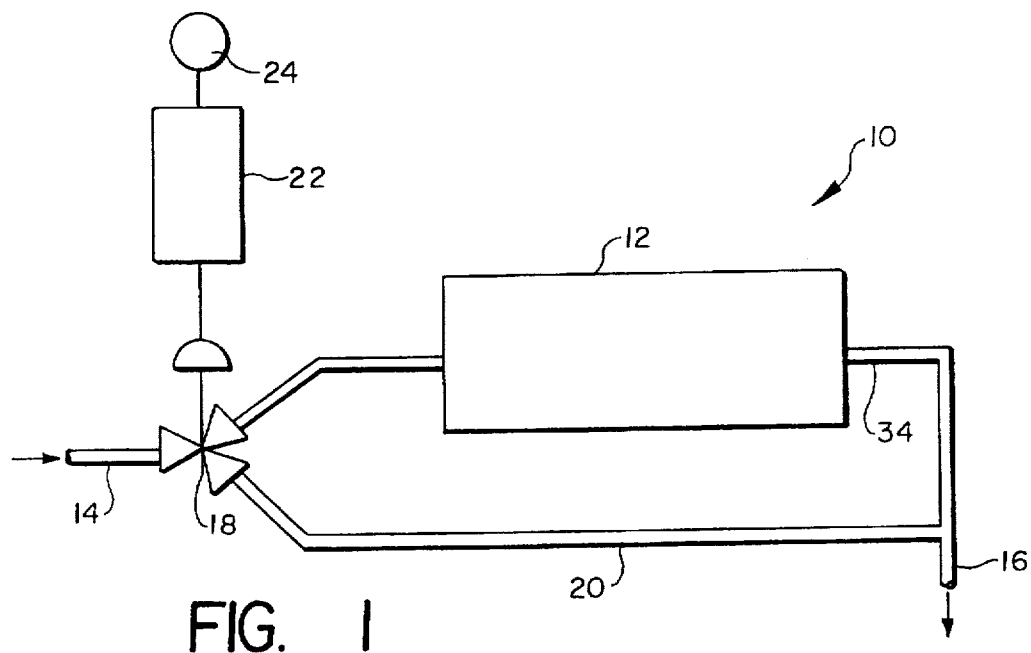
FIG. 1 is a schematic diagram of the heat dissipation sub-system of the present invention.
Figure 2:
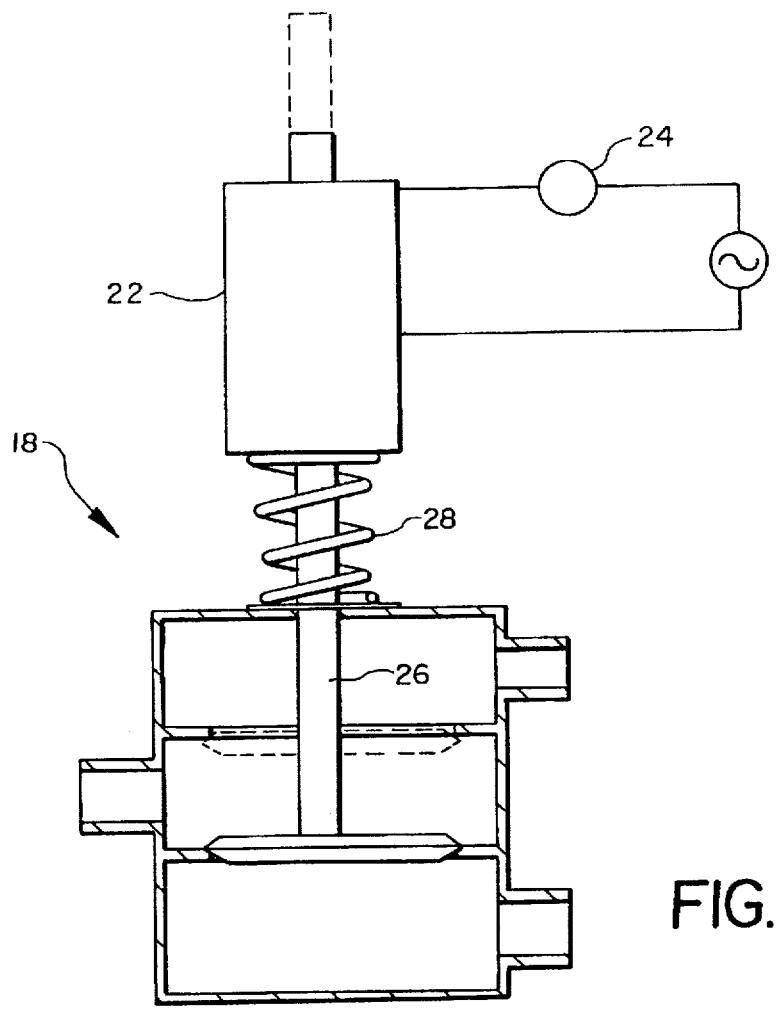
FIG. 2 is a detailed cross sectional view of the three way valve of the present invention.
Figure 3:
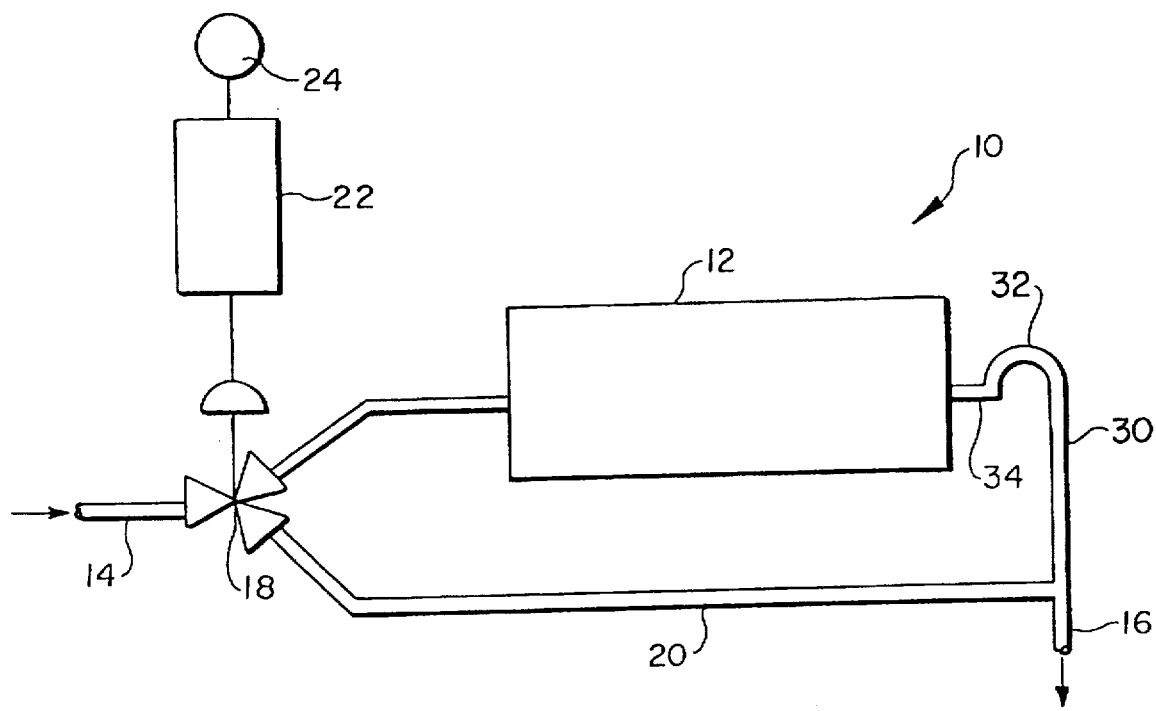
FIG. 3 is a schematic diagram of the heat dissipation subsystem of the present invention fitted with an anti-backup fitting.

Referring to FIGS. 1, 2, and 3 the first embodiment of the present invention is seen. The first embodiment relates to a heat dissipation sub-system 10 which includes a heat dissipation unit 12, a heating liquid inlet 14, a heating liquid outlet 16, a three-way valve 18, and a bypass or shunt pipe 20. The valve 18 is actuated by solenoid 22. Solenoid 22 is responsive to thermostat 24 which controls the power supply to the solenoid. Solenoid 22 is preferably of the mercury switch type. Valve 18 has a movable member 26 which is biased by spring 28 to assume a first position. When member 26 is in the first position, valve 18 prevents any flow through bypass pipe 20 and directs all heating fluid coming through inlet 14 through the heat dissipation unit 12. When the room temperature is at or above the setpoint of thermostat 24, the solenoid 22 is energized causing the member 26 to move to a second position. When member 26 is in the second position, valve 18 prevents any flow through heat dissipation unit 12 and directs all heating fluid entering inlet 14 to the bypass pipe 20. In this manner, heating of each room is independently controlled.

Heat dissipation unit 12 can be any suitable heat exchanger including a radiator or a convector with or without a fan or blower. In the most preferred embodiment, an anti-backup fitting 30 is provided intermediate the heat dissipation unit 12 and the outlet 16. The anti-backup fitting 30 is in the form of a pipe section having a bend portion 32. The bend portion 32 rises, in elevation, above the discharge opening 34 of the heat dissipation unit 12. By having the bend portion 32 rise above the discharge opening 34, heating fluid is prevented from backing up into the heat dissipation unit 12 with the aid of gravity when the heating fluid flow is being diverted through the bypass pipe 20.

Figure 4:
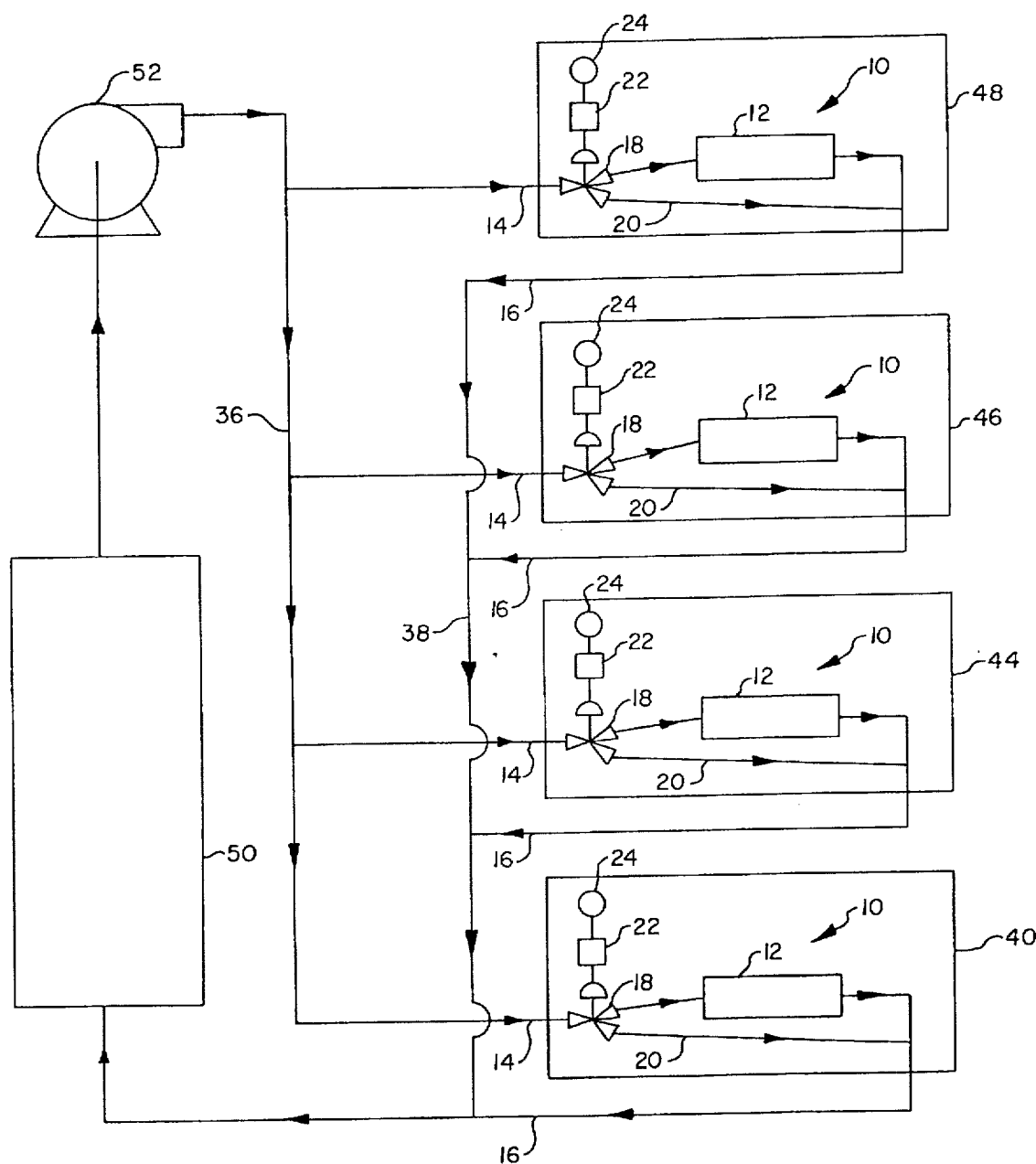
FIG. 4 is a block diagram of a heating system of the two-pipe type employing the heat dissipation sub-system of the present invention.

Referring to FIG. 4, the heat dissipation sub-system 10 is shown incorporated in the heating system of a building. The heating system of FIG. 4 is of the two-pipe type, with one heating fluid supply pipe 36 and one heating fluid return pipe 38. In the heating system of FIG. 4, the heat dissipation sub-systems 10 are connected in parallel between the heating fluid supply pipe 36 and the heating fluid return pipe 38. Each heat dissipation sub-system 10 is connected to the heating fluid supply pipe 36 at its inlet 14 and to the heating fluid return pipe 38 at its outlet 16.

Each of the rooms 40, 44, 46, and 48 is provided with at least one heat dissipation sub-system 10. Each heat dissipation subsystem 10 is provided with an associated thermostat 24 located in the same room as the heat dissipation subsystem 10. Thus the thermostat setpoint can be set independently for each room. Hot water, for example, is pumped from boiler 50 through the heating system by pump 52. When the temperature in any given room reaches the setpoint for that room, the valve 18 operates to direct heating fluid flowing through inlet 14 to the bypass pipe 20 for that room. Thus, heating fluid no longer flows through the heat dissipation unit 12 for that particular room, and heating of that room is ceased. Despite the fact that the heat dissipation unit 12 for the room is now off-line, because the flow that would normally have gone through the heat dissipation unit 12 is now directed through the bypass 20, the flow through the other heat dissipation units 12 will not be affected. In addition, the back pressure on pump 52 will not be increased, and overall the dynamics of controlling the heating system will not be made more complicated. When the temperature in the room drops below the setpoint, the valve 18 operates to resume heating fluid flow through the heat dissipation unit 12 while shutting off heating fluid flow through the bypass pipe 20.

Figure 5:
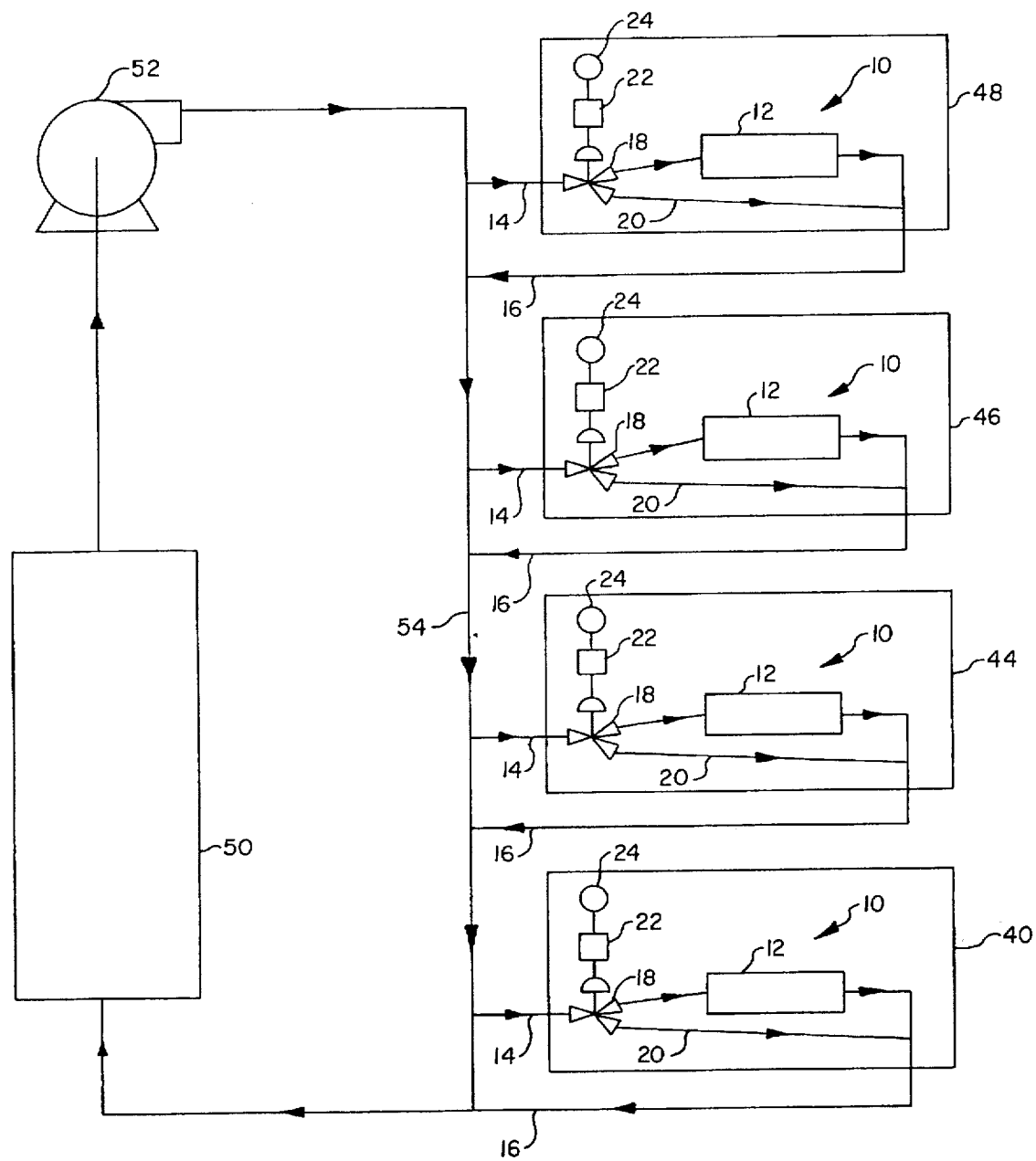
FIG. 5 is a block diagram of a heating system of the single pipe type employing the heat dissipation sub-system of the present invention.

Referring to FIG. 5, the heat dissipation sub-system 10 is shown incorporated in a heating system of the single pipe type. In the heating system of FIG. 50 heating fluid is supplied to the inlet 14 of each heat dissipation sub-system 10 through the pipe 54, and heating fluid is returned from the outlet 16 of each of the heat dissipation sub-systems 10 to the same pipe 54. All other components in the heating system of FIG. 5 function in the same manner as discussed with respect to the heating system of FIG. 4.

For large rooms, providing more than one heat dissipation subsystem in a room, with each having its own associated thermostat, allows the maintenance of different temperature zones within the same room.

Figure 6:
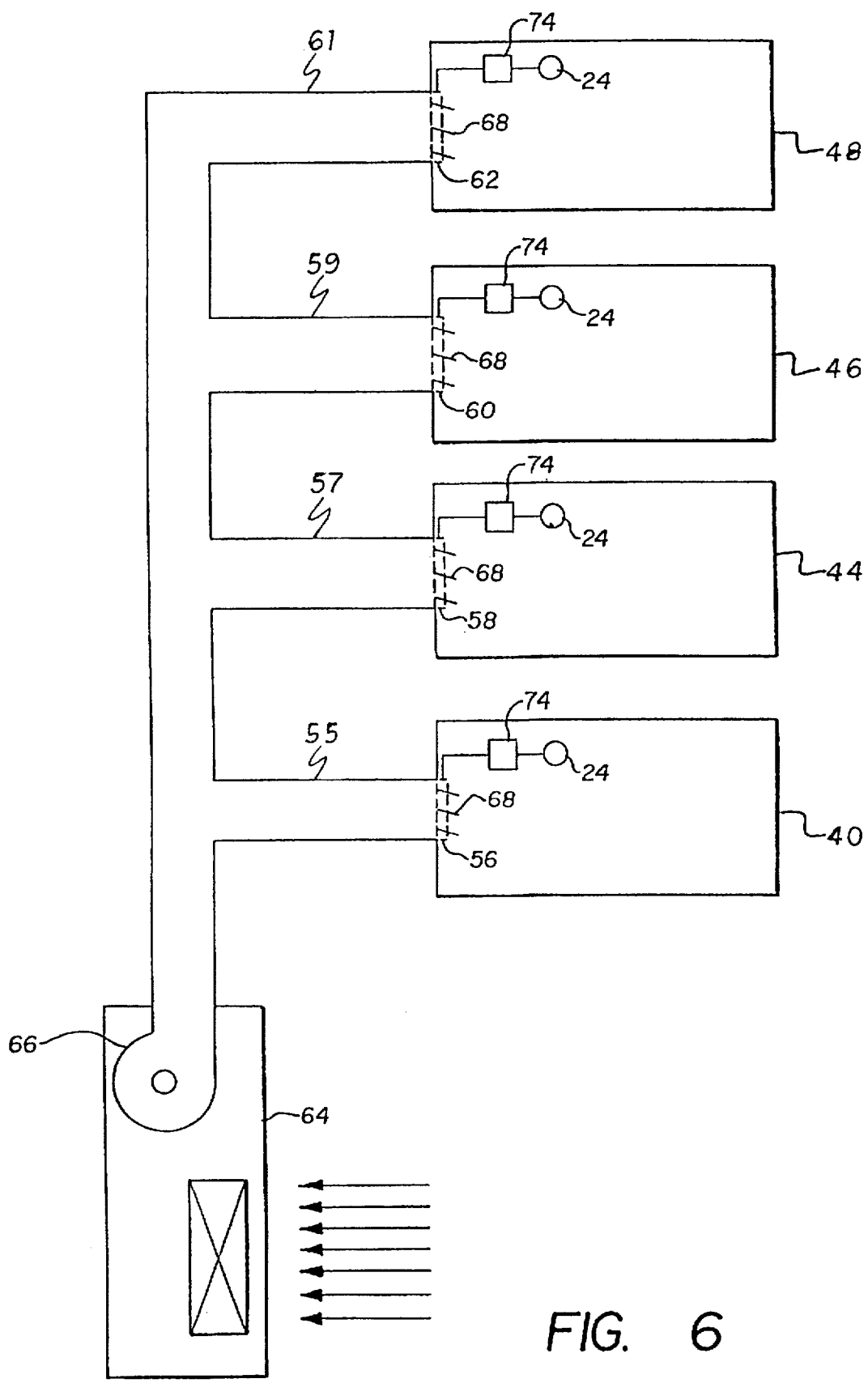
FIG. 6 is a schematic diagram of an air distribution type of climate control system employing the thermostatically controlled louvers of the present invention.
Figure 7:
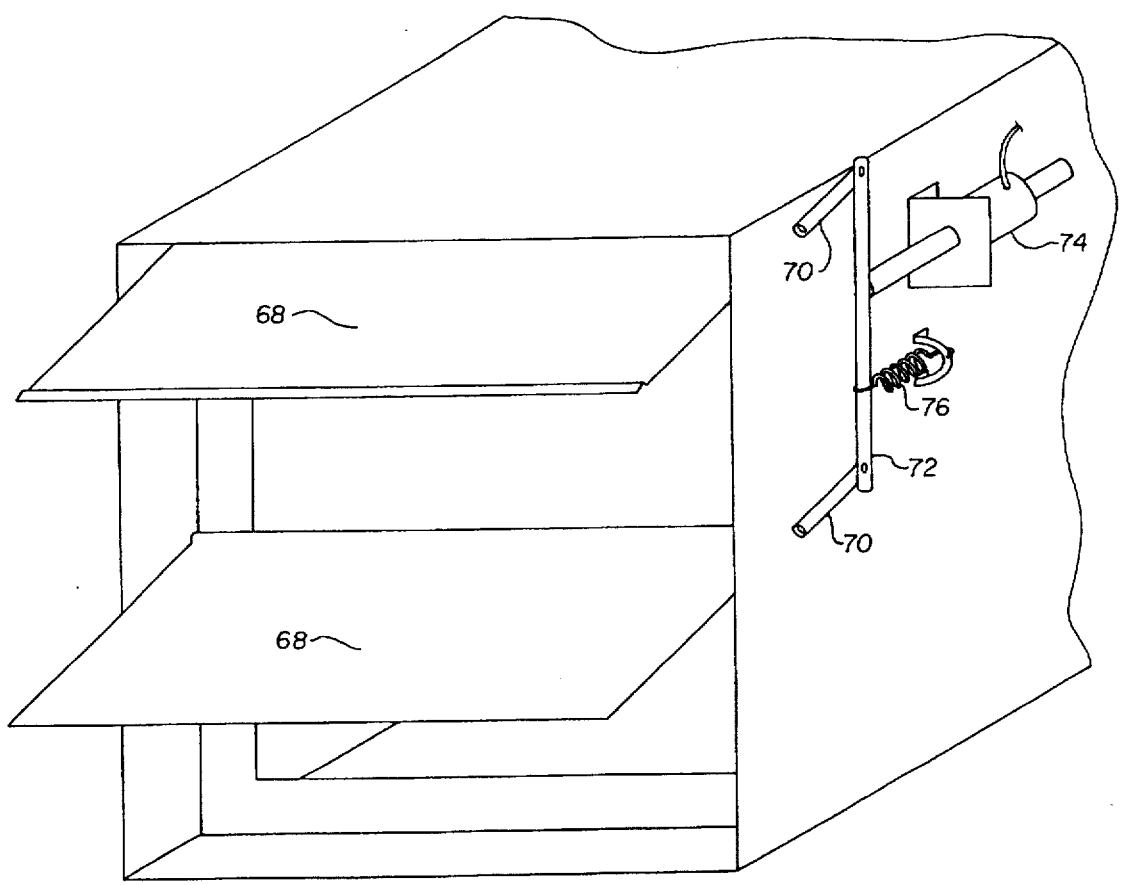
FIG. 7 is a perspective view showing details of the thermostatically controlled louvers of the present invention.

Referring to FIGS. 6 and 7, the second embodiment of the invention can be seen. FIG. 6 shows a typical air distribution heating system. Rooms 40, 44, 46, and 48 are heated by heated air blown into the rooms through ducts 55, 57, 59, and 61 and respective registers 56, 58, 60, and 62. The heated air supplied by furnace 64 is moved through registers 56, 58, 60, and 62 by blower 66. As before, each room has its own thermostat 24. However in this embodiment, each thermostat 24 controls the opening and closing of a set of louvers 68 provided at each of the registers 56, 58, 60, and 62. When the room temperature is at or above the setpoint for the particular room, the louvers shut off heated air flow to the room thereby preventing further heating of the room. When the temperature drops below the setpoint, the louvers are opened allowing the heating of the room to resume.

Referring to FIG. 7, the louvers 68 are hinged and pivot between a closed position and an open position. Arms 70 are fixed to respective louvers 68 and pivot therewith. Bar 72 ensures that all the louvers 68 in a given set pivot in unison. Thermostat 24 controls power supply to a solenoid 74. Spring 76 causes the louvers 68 to be normally open. When the room temperature reaches the setpoint, solenoid 74 is energized, causing bar 72 to be pushed toward the louvers to thereby close the louvers. As before, when the room temperature drops below the set point, the solenoid 74 is de-energized allowing louvers 68 to open due to the force exerted by spring 76. Although a solenoid was employed in the illustrative examples described above, it should be apparent to those of ordinary skill in the art that a rotary electric motor could also have been used to accomplish the same tasks.

It is to be understood that the present invention is not limited to the embodiments described above, but encompasses any and all embodiments within the scope of the following claims.

I claim:

1. A climate control system for independently controlling the temperature in a plurality of rooms within a building, said climate control system comprising:

a source of heating/cooling fluid;

a plurality of ducts, each communicating with said source of heating/cooling fluid and having an opening extending to each of the plurality of rooms;

a plurality of registers, each provided at said opening of a respective one of said plurality of ducts;

a plurality of sets of louvers, each set of said plurality of sets of louvers provided at a respective one of said plurality of registers, each set of said plurality of sets of louvers being movable between a closed position blocking heating/cooling fluid flow through said respective one of said plurality of registers and an open position allowing heating/cooling fluid flow through said respective one of said plurality of registers;

a plurality of electromechanical actuating mechanisms, each of said plurality of electromechanical actuating mechanisms being mechanically linked to a respective set of said plurality of sets of louvers to move said respective set of said plurality of sets of louvers between said open position and said closed position; and a plurality of thermostats, each located within a respective one of the plurality of rooms and connected to a respective one of said plurality of electromechanical actuating mechanisms, said respective one of said plurality of electromechanical actuating mechanisms moving said respective set of said plurality of sets of louvers responsive to a respective one of said plurality of thermostats; whereby each of said plurality of electromechanical actuating mechanisms responsive to a respective one of said plurality of thermostats causes a respective one set of said plurality of sets of louvers to be moved to said closed position when air temperature in the one of the plurality of rooms housing said each one of said plurality of thermostats is above a user selected setpoint temperature during a heating cycle, and below a user selected setpoint temperature during a cooling cycle.

2. The climate control system according to claim 1, wherein said each set of said plurality of sets of louvers includes a pair of pivotal arms connected by a bar, said bar being mechanically linked to each of said plurality of electromechanical actuating mechanisms.

3. The climate control system according to claim 2, wherein said bar includes biasing means to force each said set of louvers to open.

4. The climate control system according to claim 1, wherein each of said plurality of electromechanical actuating mechanisms includes a solenoid.

\* \* \* \* \*